US004001660B2

United States Statutory Invention Registration [19]

[11] Reg. Number: H1660

[45] Published: Jul. 1, 1997

Herman et al.

[54] PROCESS FOR AUTONOMOUSLY LOCATING AND RETRIEVING TOXIC HEAVY METAL AND RADIOACTIVE CONTAMINANTS

[75] Inventors: Richard S. Herman, Clifton; Gasper J. Sacco, Succasunna, both of N.J.

[73] Assignee: The United States of America as represented by the Secretary of the Army, Washington, D.C.

[21] Appl. No.: 613,755

[22] Filed: Feb. 26, 1996

[51] Int. Cl.[6] ..... B62D 63/00

[52] U.S. Cl. ..... 180/6.2; 15/340.1

*Primary Examiner*—Bernarr E. Gregory

*Attorney, Agent, or Firm*—Anthony T. Lane; Edward Goldberg; Michael Sachs

[57] ABSTRACT

A process is described which will autonomously map an area, autonomously search for concentrations of depleted uranium, automatically record the intensity of radiation, and record the exact map location in real time.

8 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR AUTONOMOUSLY LOCATING AND RETRIEVING TOXIC HEAVY METAL AND RADIOACTIVE CONTAMINANTS

GOVERNMENTAL INTEREST

The invention described herein may be manufactured, used and licensed by or for the U.S. Government.

BACKGROUND OF THE INVENTION

Presently large areas of Government-owned firing ranges and proving grounds have been rendered less useable because of contamination caused by the depositions from depleted uranium warheads. Depleted uranium warheads scattered over an area are considered a hazard because of their inherent heavy metal toxicity and their residual radioactivity.

The present method of cleanup is a complex hazardous procedure requiring the use of manpower and equipment exposed to haphazardous conditions. The existence of unexploded warhead duds located in the same general vicinity of the depleted uranium rounds further complicates the decontamination procedure. the combination of hazards require recovery teams to wear full body protective gear as well as radiation monitoring gear such as dosimeters. At the completion of a search everyone involved is required to go through decontamination procedures. The present method is considered "haphazard" primarily because the search team search pattern is not accurately mapped. Since many of the range areas of concern are contaminated with High Explosive Unexploded Ordnance (UXO) and heavy metal poisoning hazards they have been categorized as a grade II hazard. This condition of hazard has led to the death or injury to recovery team personnel. Because the areas to be searched are classified as a radioactive zone, there is also a time restriction as to the duration of time the search team members can remain in the contaminated area. Acerbating the problem is the fact that all currently known radiation detection equipment must skim within an inch or two of the ground necessitating a very narrow field of view.

SUMMARY OF THE INVENTION

The present invention relates to a system for autonomously mapping proving ground firing areas, for autonomously searching for concentrations of depleted uranium in the mapped area, for automatically recording the intensity of radiation and the exact map location of depleted uranium rounds in real time.

An object of the present invention is to provide an autonomous operating mobile system which follows navigational instructions generated by a path planner that is located in a base console outside of a contaminated area.

Another object of the present invention is to provide complete definition of a contaminated search area having a computer preprogrammed in a base console for tracking and recording the tracks of the mobile system by using inertial navigation and global positioning devices.

Another object of the present invention is to provide a system for improved coverage of a contaminated area to be searched by having a base console computer programmed for generating its own search patterns from defense mapping agency maps and site surveys.

Another object of the present invention is to provide a system for improved accuracy of data for recovery of contaminants utilizing mapping information by comparing inertial data to differential global positioning data to a survey marker and an original defense mapping agency map. The mapping and survey data is stored on a magnetic device such as a 90 megabyte Burnoullie hard drive.

Another object of the present invention is to provide a system for locating and accurately mapping the location radioactively contaminated material in an area without subjecting recovery personnel to unexploded ordnance, toxic heavy metal, and radiological hazards associated with the area.

A further object of the invention is to provide a process for cleanup of a contaminated area wherein the number of personnel involved in locating the contaminating material, and for eliminating personnel exposure to the hazards of the area during the search and mapping of the area.

For a better understanding of the present invention, together with other and further objects thereof, reference is made to the following descriptions taken in connection with the accompanying drawings.

BRIEF DESCRIPTION OF THE DRAWINGS

Throughout the following description like reference numerals are used to denote like parts of the drawings.

DETAILED DESCRIPTION OF THE PREFERRED EMBODIMENTS

Figure 1:
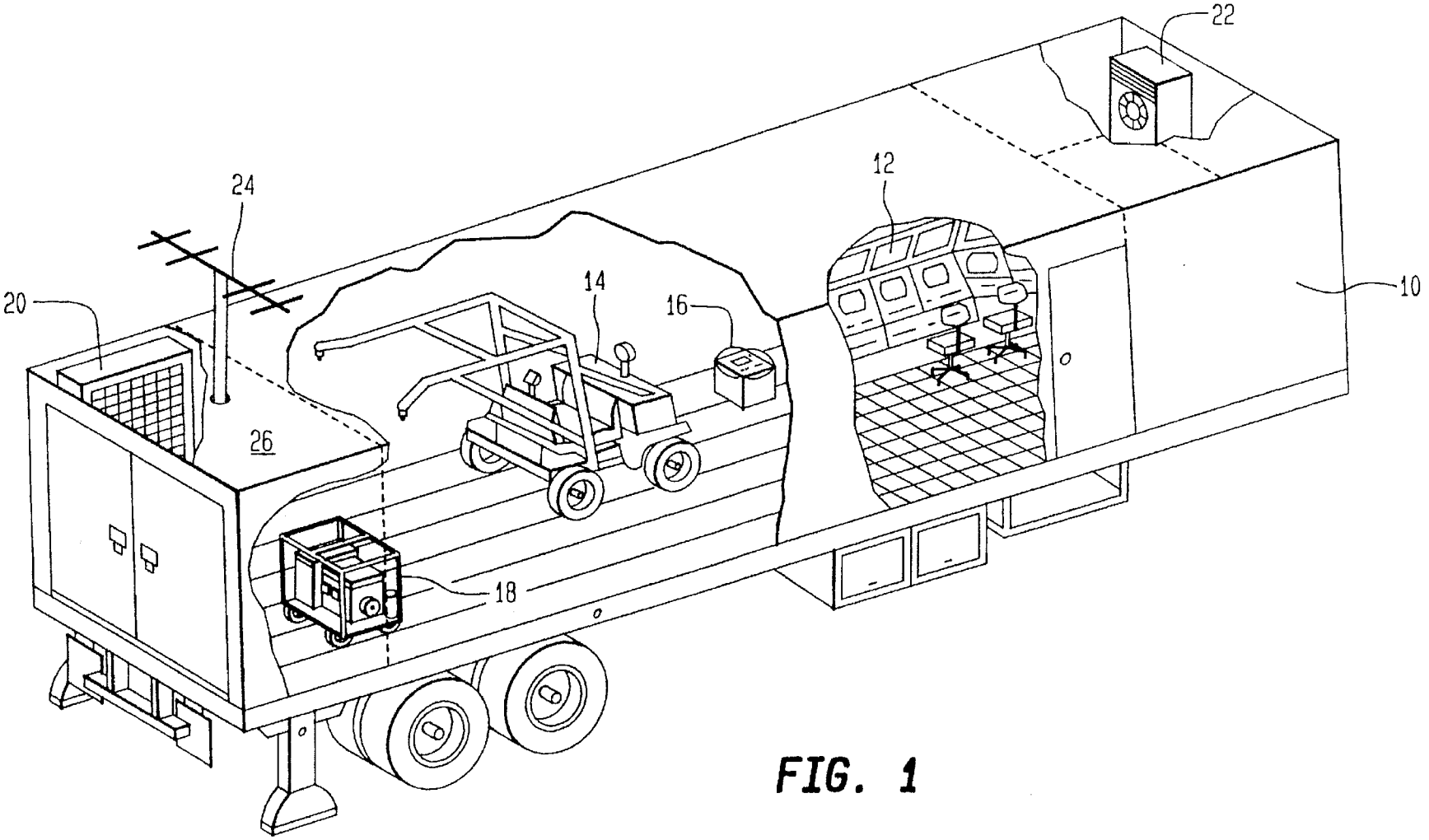
FIG. 1 is a partial cut-away isometric view of a trailer outfitted as a completely independent transportable system.

Referring now to FIG. 1, once a zone of concern, such as a large area of a missile range, is defined as the contaminated area of interest, a search trailer 10 is dispatched to the area. If the location is too distant for movement by cab or is inaccessible by road, the trailer 10 can be moved by rail or air. All of the equipment and vehicles contained herein are tied down for movement. A base station console 12 is located in the front section of the trailer 10. In the middle of the trailer 10 is a mobile platform 14, with its payload to be described later in greater detail. A portable control system 16 is located in front of mobile platform 14. A 25 kilowatt standard gasoline driven electric generator unit 18 with wheels mounted thereon, is shown to the rear of mobile platform 14. The trailer 10 holds sufficient fuel and supplies for twenty-four hours as an independent base station for the operators and provides the necessary chemicals or water for radioactive decontamination of the mobile platform and its associated payloads. The cab, not shown, positions the trailer in a convenient parking spot near a border of a field of interest. The trailer 10 is separated from the cab and the trailer 10 is blocked in position. An airconditioner 20 is supported on a rear wall of the trailer 10 and an electric heater 22 is located on front end. An antenna 24 protrudes through trailer roof 26.

Figure 2:
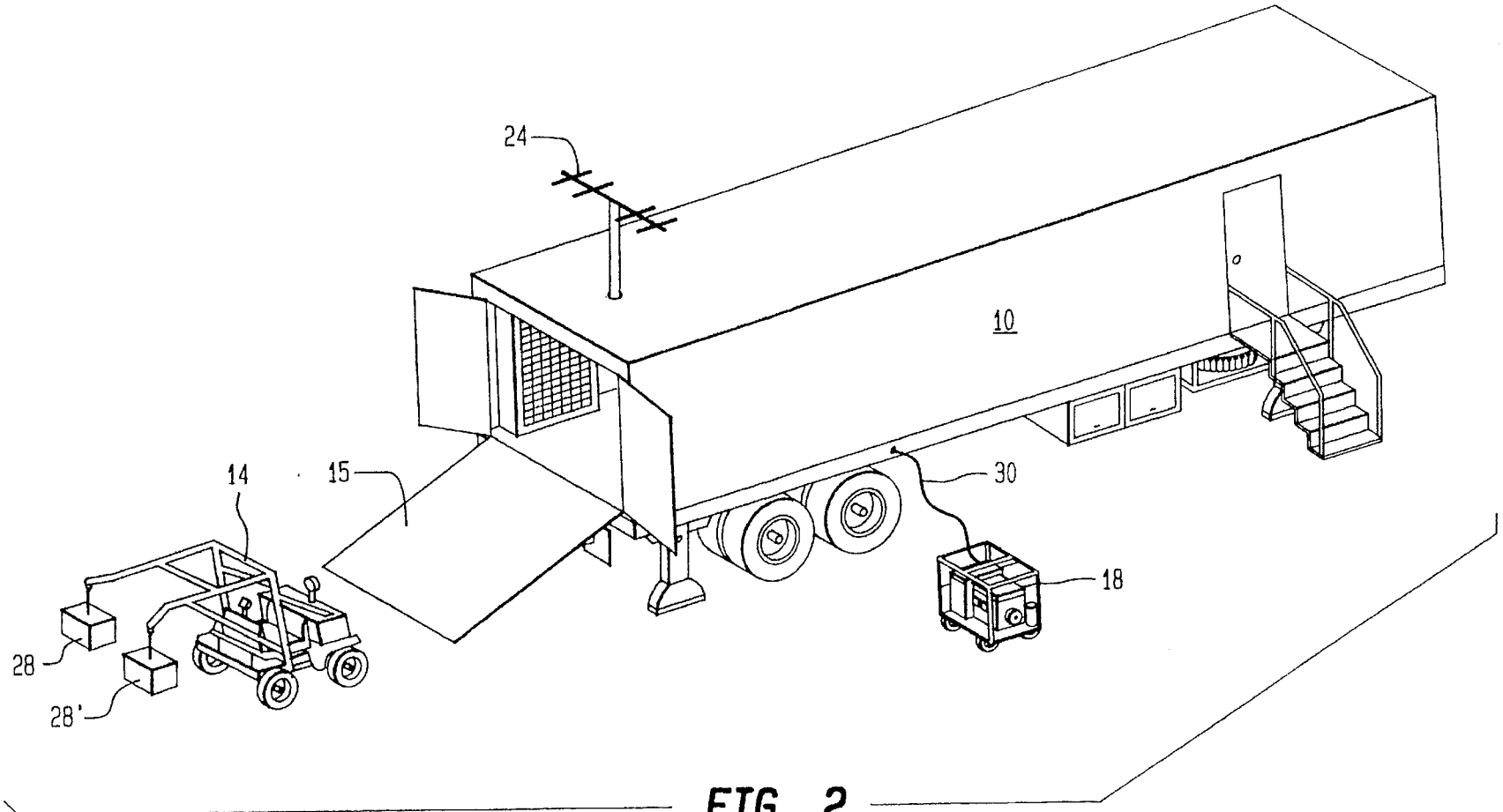
FIG. 2 is an isometric view of the trailer off-loading mobile system.

FIG. 2 shows the trailer 10 in the step of off-loading of the mobile platform 14 by means of ramp 15. After the mobile platform 14 is off-loaded, two radiation detection cameras 28 and 28' and electrically connected to the local mobile platform power sources and the vehicular computer contained within the mobile platform 14. The mobile platform 14 and the portable electric generator 18 are both fueled, and the generator 18 is electrically connected to the trailer 10 by electrical connector 30. The generator 18 is then started energizing the mobile platform 14 and the trailer 10 and its operating equipment, such as the base station console 12 and the cooling and heating units 20 and 22 respectively. The mobile platform 14 is then turned on by an enabling receiver and associated power logic positioned on the mobile platform 14.

Figure 3:
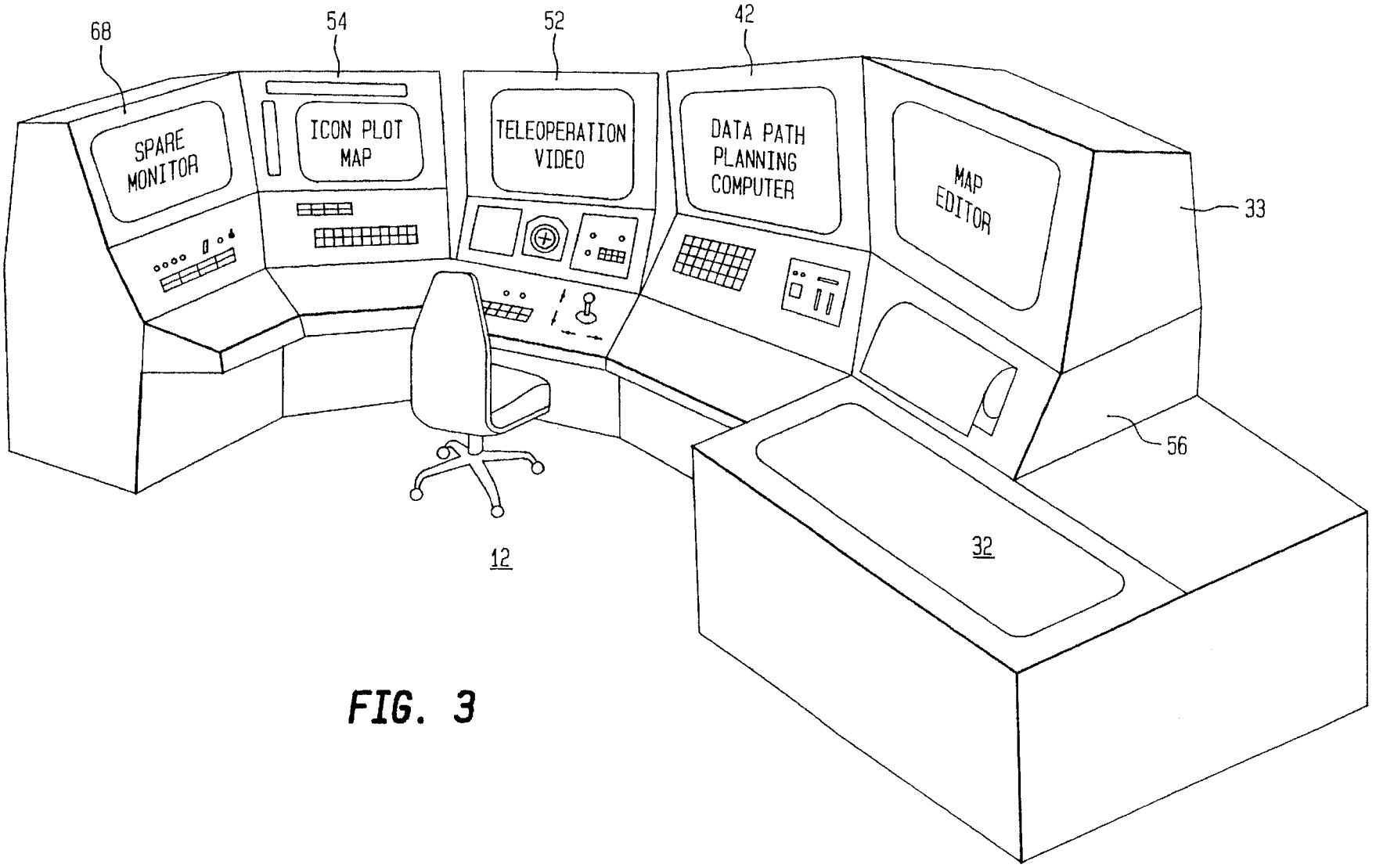
FIG. 3 is an isometric view of the control console for operating and controlling the movements of a mobile platform.
Figure 4:
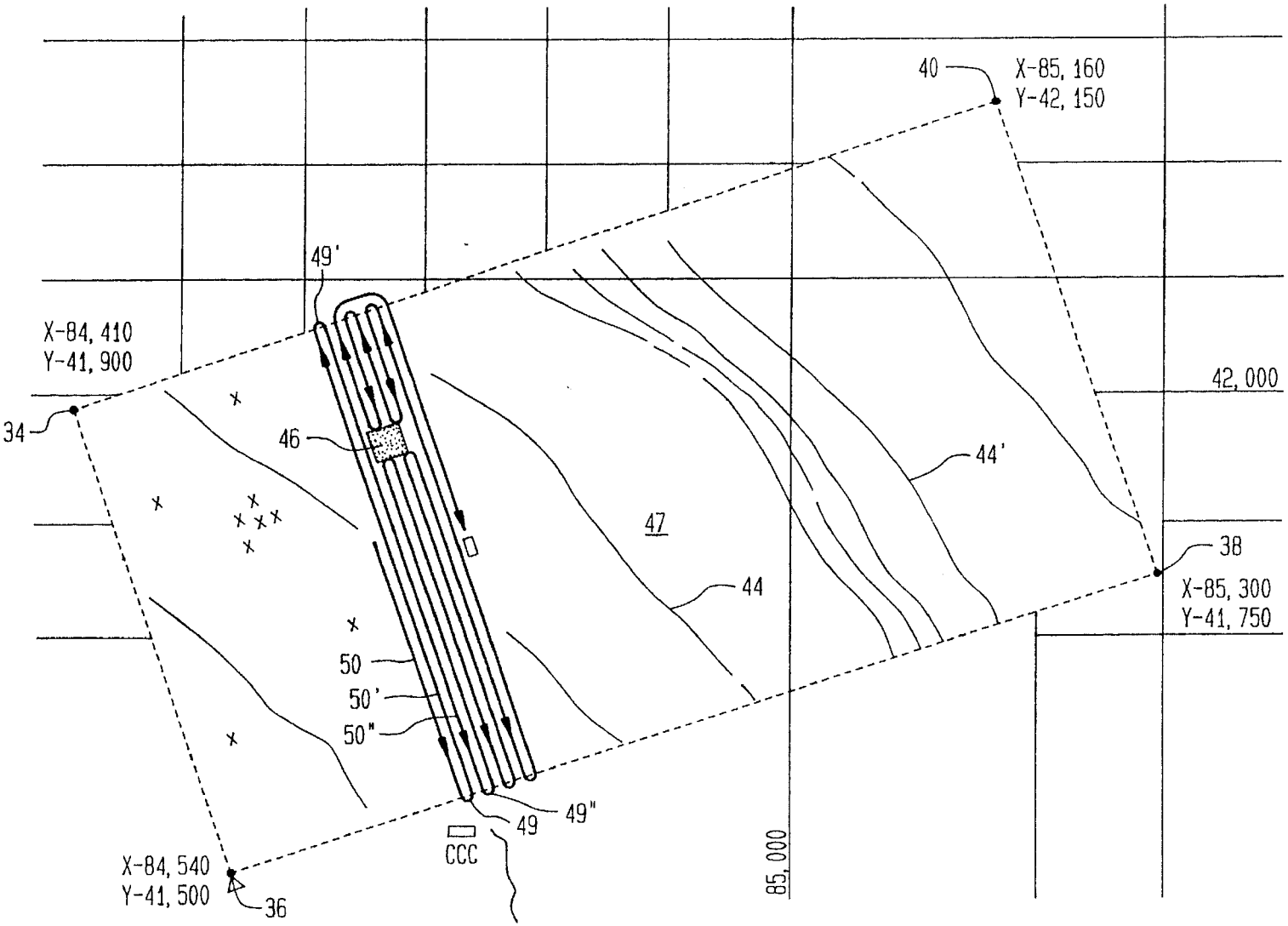
FIG. 4 is a map plot of a typical contaminated site area with its corner x-y coordinates indicated and the glide paths of an autonomous mobile platform.

Referring now to FIGS. 3 and 4, a base console operator lays a generic area map of the area on a map table 32 which is part of an x-y plotter of base console 12 of trailer 10. The table 32 is used for scanning in the map which appears on the map editor 33. Maps of interest are available and may be obtained from the Defense Mapping Agency, Topographic, Washington, D.C.. The standard high feature map, showing the topography of interest uses a scale of one inch per 12,500 feet. The next step would consist of inserting the map reference coordinates, shown as points 34, 36, 38 and 40 in FIG. 4, from one boundary of the map into the path planning computer 42 using a scanning light pen. The next step constitutes drawing in a general map of the area to be searched, including topological features, such as elevational lines 44, 44' etc. or obstructions 46 which may be in the area to be searched. This field to be surveyed map 47 shown within the boundaries of the dotted line rectangle of FIG. 4 with the starting coordinates is displayed on the map editor display console monitor 33 and is simultaneously stored in the path planning and navigation computer 42. The path planning computer 42 is then programmed to develop the map nodes 48, 48', 48" etc. and then to connect the nodes with the inertial paths, indicated by lines 50, 50', 50" etc., for the platform 14 navigation. The computer 42 will automatically lay out a series of nodes 48, 48', 48" along the borders of the field of interest and connect the nodes 48, 48', 48" with a series of paths 50, 50', 50" such that, when the platform 14 follows the inertial path instructions, each path will be about nine feet away from any adjacent path. If the topological map 47 shown on FIG. 4 indicates a unique area such as a cut or a peak that would not be navigable by the mobile platform, the computer 42 would develop a map path around this anomaly 46. All the information is developed on a "486" computer and displayed on map editor 33. Referring again to FIG. 4, a segment of the impact area included within the dotted lines field of interest is an area which in this instance is 2.66 miles wide by 5.05 miles long. The area of interest in this case is about 13.5 square miles. The path planning computer 42 would plot 2962 individual inertial paths connecting 5924 nodal points. The teleoperation video console 52 on the left of the path planning computer 42 is used for teleoperation of the mobile platform vehicle 14. The video screen 54 is used for showing icon plots as the mobile platform 14 traverses the field of search shown in FIG. 4. The data from the path planning computer 42 is extracted either digitally using a printer, not shown, or by analog signal using a map plotter 56.

The position of the platform 14 is determined by using two separate multi-channel Global Positioning Systems (GPS) receivers. These GPS receivers, presently available as state-of-the-art equipment, are tuned to receive signals from twenty-four satellites that synchronously orbit the earth. By comparing these transmissions against one another the determination of the location of the receiver is obtained. If a single GPS receiver is held stationary and its exact location determined by means independent of a transmitting satellite system, a second, mobile receiver can be slaved to the first. A phase calculation is made between the signals that each is receiving and the position of the mobile platform can be determined to within six inches when referenced to the fixed receiver. In the present invention the fixed receiver is mounted in the trailer 10, the mobile receiver is mounted on the mobile platform 14. In the present instance the fixed GPS receiver located on the trailer 10 is turned on and its physical location accurately surveyed. The next step is entering the data into the path planning computer 42 for future reference. A survey marker is placed at the survey point becoming a permanent survey marker useable for future operations. A computerized map is generated by map plotter 56 noting the survey marker identification.

The platform 14 is then remotely started up, the platform 14 computers, not shown, are turned on, and the platform 14 is teleoperated by personnel in the trailer 10 over to the nearest border shown as dotted lines on FIG. 4. The platform's 14 "on board" GPS is aligned with the "surveyed" GPS unit located in trailer 10, which then accurately locates the platform 14 and aligns the platform coordinates with map coordinates on the map which is stored in the navigation computer 42. The platform 14 is then instructed by R.F. signals from antennae 24 to enter the mapped zone of FIG. 4 and begin its autonomous patrol. The platform 14 appears on map editor display monitor 33 as an icon that moves along the inertial paths in response to the platform 14 movement.

The platform 14 undercarriage is protected by an armor covering molded to a base, not shown, that is made up of lightweight layers of ceramic material. This armor protection is used to minimize damage from unexploded ordnance that might be inadvertently set off damaging the platform 14 or its payload.

The platform 14 functional payload includes the GPS mobile receiver; a communication system to receive navigational data and instruction from the base station 12 and to transmit back positional data; a video camera, not shown, for transmitting data for teleoperation; data storage equipment for recording data on contaminants found; data compression equipment for reducing R.F bandwidth requirements; sensors for collision avoidance; and an intergraded gamma sensor system previously referred to as cameras 28 and 28'. Each of the cameras 28 and 28' is mounted on the platform 14 such that the zone of coverage is ahead of the platform 14.

Figure 5:
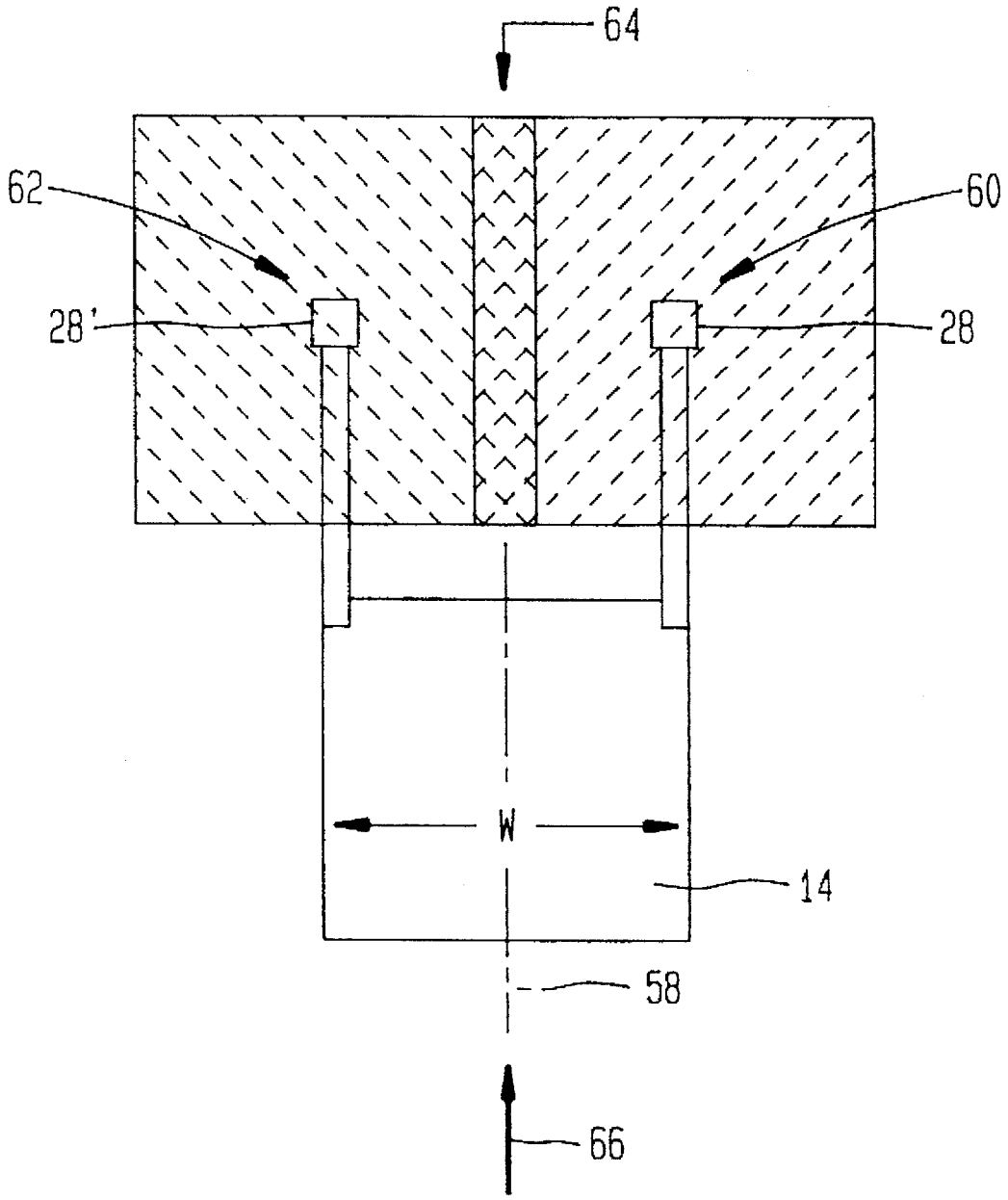
FIG. 5 is plan view of the field of view of two radiation detection cameras carried by a mobile platform.

Referring now to FIG. 5, the radiation detection cameras 28 and 28' are mounted six feet apart and three feet off the center axis 58 of the mobile platform 14. Each camera "seeing" an area of about seven feet square. The dashed diagonal line area 60 represents the field of view of camera 28. The dashed diagonal line area 62 represents the field of view of camera 28'. The cross-hatched area 64 represents a one foot overlap of the fields of view. The platform 14 has a maximum width W which does not exceed six and a half feet. Thus each sweep of the platform looks at an area that is about thirteen feet wide, six and a half feet on each side of glide path line 66. The field is laid out with a series of glide paths as shown by lines 50, 50', and 50" of FIG. 4 that are nine feet apart. Each sweep of the platform 14 would overlap a previous sweep by about two feet. When the platform 14 has an average speed of approximately eleven miles per hour, the area of the map within the boundaries of coordinates 34, 36, 38 and 40 of FIG. 4, would require about 30 days to completely map the area. Additional payloads such as metal detectors, not shown, could look for concentrations of ferrous material, which would indicate the possibility of unexploded ordnance.

After the mobile platform 14 has completed its patrol of the map area shown on FIG. 4 and returned to the starting point, the platform is instructed by its on board computer to signal the base console 12 operator. The base console 12 operator will draw a map of the zone of patrol on a plotter 54 indicating the location of each "find" X, indicated on FIG. 4 and, by the intensity of the marking, indicate the degree of radioactivity. The system also has the capability of generating a computer printout listing the hit number, the locating map coordinates, the camera registering the hit, the angle of the hit, and the intensity of the hit.

The data received by base console 12 operators is stored on 3.5 inch diskettes and is easily read out or plotted by any computer with the access software. The data is used to develop a recovery strategy. The base station can elect to use the data listing or data plot to send recovery personnel to the exact location, or to enter the data or the hit number and command a special retrieval platform, not shown, to return to the hit location by the most economical and safe path.

At the completion of the mission, the levels of contamination on the platform is checked by the trailer personnel. If the platform 14 is determined to be contaminated, it would be decontaminated before being reloaded onto the trailer 10.

The platform 14 has two modes of operation or control. The primary mode is the autonomous mode under control of the base station computer 42 which contains all the mapping data and the glide path requirements. The secondary mode is by teleoperation, wherein an operator in the trailer 10 controls the platform 14 motion by using speed and steering controls inside the trailer 10 or the portable control system 16 and monitors the platform 14 motion via the video monitor 52. In either mode of the inertial navigation system, the icon which appears on the map editor display monitor 52, keeps track of the platform location. The base console 12 station also includes a spare monitor 68.

In operation the platform 14 patrols the field 47 to be surveyed, based on instructions from the navigation computer 42 in the trailer 10. The platform 14 is instructed by the path planning computer 42 to follow specific inertial paths that connect boundary nodes 48, 48', 48" etc. The platform 14 follows these programmed paths using an "on-board" inertial guidance system and occasionally up-dates both its own position and the accuracy of the map stored in the base console with its differential GPS. The differential GPS updates all mapping data at no less than every nodal point. Thus the inertial errors are not magnified from one point to another nor do they create a cumulative error. During a sweep, if the radioactive cameras 28, 28' detect any low level radiation, the "on board" platform system will send back to the base station console 12 the "hit" number, an accurate map location, the signal intensity, the camera registering the hit, and the angle of the hit. The base station 12 registers all the data in its data base computer 42. A Local Area Network Bus for both the console 12 and the platform 14 is capable of multitasking. In the event that the system's inertial path takes platform 14 into an area that it cannot safely maneuver in, a collision avoidance system detects the situation. The platform 14 on-board computer would first try to work its way out of the situation using its on-board sensors and the contour type data stored in the navigation computer. If this is not practical, the platform 14 will stop maneuvering and send an alarm to the base station console 12. The console operator would then assess the situation using the platform's video cameras. If the operator cannot teleoperate the platform 14 out of the situation, the platform 14 is commanded to return to the last valid node by retracing its last path. A new set of inertial paths are then plotted on the base console automatically blocking out the blind spot.

While a specific embodiment of the invention has been shown and described in detail to illustrate the application of the principles of the invention, it will be understood that the invention may be embodied otherwise without departing from such principles.

What is claimed is:

1. A process for locating, marking and retrieving depleted uranium rounds from contaminated proving ground areas which steps include:

outfitting a trailer with a base console having the electronic capability of reading a generic map and developing therefrom a search map plot for establishing the boundaries and topological features of said contaminated area to be autonomously searched;

providing a mobile platform carried by said trailer for autonomously operating in said contaminated area on remotely transmitted instruction of said base console;

providing a mobile generator for supplying the electric power for said base console;

surveying the accurate location of a fixed multi-channel global positioning receiver for use by operators stationed at said base console;

outfitting said mobile platform with a mobile second multichannel global positioning receiver that is slaved to said fixed global positioning receiver for accurately determining the distance of said mobile receiver to said fixed receiver;

outfitting said mobile platform with a plurality of low level radiation detection cameras for sensing the location of said depleted uranium rounds and for transmitting their initial position to said base console;

remotely instructing the movement of said mobile platform, by teleoperation from said base console, to begin searching the contaminated area for depleted uranium rounds along inertial specifically computerized map paths having boundary nodal point limits generated by said base console and remotely instructing said mobile platform to return to said trailer.

2. A process as recited in claim 1 wherein the step of outfitting a trailer with a base console includes:

installing a map table for electronically reading said generic map;

electrically coupling an x-y plotter to said map table for generating x,y map coordinates for said search map plot; and electrically coupling a map editor monitor for viewing said search map plot.

3. A process as recited in claim 2 wherein said step of outfitting said trailer includes programming a path planning computer to receive x,y coordinate data from said x-y plotter and said map table and for generating map boundary nodes and inertial path guidance data for said mobile platform during its autonomous searching.

4. A process as recited in claim 3 wherein said step of outfitting said trailer includes electrically coupling a teleoperation video monitor to said mobile platform for allowing base console operations to observe the field of search of said mobile platform.

5. A process as recited in claim 4 wherein said step of outfitting said trailer includes electrically coupling an icon plot map console for receiving data from said mobile platform as it searches the area and for displaying it on an icon plot map monitor.

6. A process as recited in claim 5 wherein said step for autonomously operating said mobile platform includes:

operatively positioning a global positioning system on said mobile platform;

installing a communication system on said mobile platform for receiving navigational data from said base console and for transmitting positional data to said base console;

mounting a video camera on said mobile platform for transmitting data for teleoperation;

positioning electrical data storage equipment on said mobile platform for recording data on contaminants found;

operatively mounting data compression equipment for reducing R.F. bandwidth requirements;

installing a plurality of sensors for collision avoidance between said mobile platform and ground obstacles; and operatively positioning an integrated gamma ray sensor system.

7. A process as recited in claim 6 wherein said steps include positioning two low level radiation cameras on said mobile platform so that their zone of coverage is ahead of the platform.

8. A process as recited in claim 7 wherein said steps include mounting said radiation cameras six feet apart with each having a field of view of seven feet by seven feet such that each sweep of the mobile platform would look at an area that is approximately thirteen feet wide.

* * * * *